Patented Apr. 7, 1931

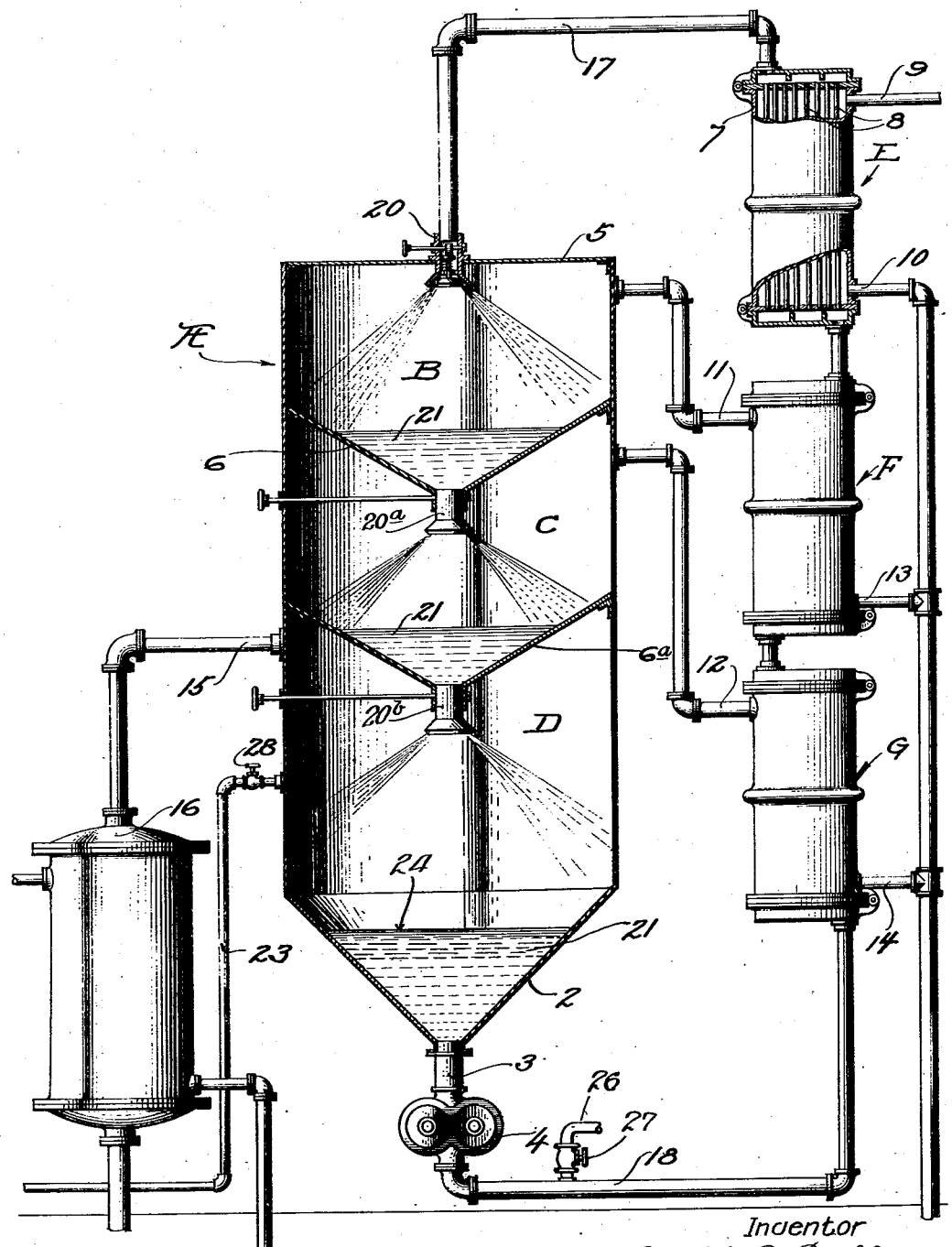

1,799,478

UNITED STATES PATENT OFFICE

DAVID D. PEEBLES, OF EUREKA, CALIFORNIA

METHOD OF EVAPORATING LIQUIDS AND APPARATUS THEREFOR

Application filed February 5, 1925. Serial No. 7,027.

This invention relates to a method of evaporating liquids and an apparatus therefor, and especially to a method which involves multiple effect evaporation.

In all cases where large quantities of water have to be evaporated from a solution to effect concentration thereof, and where the cost of fuel is a large item of this expense, it is very desirable whenever possible to take advantage of what is known in the art as "multiple effect evaporation"; that is, the vapors of one effect or stage of the evaporator are employed to heat the liquids in the next effect or stage of the evaporator, and so on, through any number of effects desired, thus obtaining a very increased fuel economy.

In concentrating a liquid containing solids that are very sensitive to temperatures, this method of evaporation heretofore could not be used, as each successive effect or stage of the evaporator of necessity works at different pressures. Thus, the boiling point in one of them will be greatly higher than the boiling point in the succeeding effect, and the liquid will be exposed to high temperatures over a long period of time, as the liquid flows slowly through the several effects of the evaporator.

To make this clear I can give an example of a double effect evaporator as now in use. It consists of two evaporators standing side by side. The heating belt of the first evaporator is connected to some source of heat, such as live steam, and the vapor outlet of said evaporator is connected to the heating belt of the second evaporator. The liquid boils in the first evaporator at a temperature of say 160° Fahrenheit, and a vacuum is maintained on this evaporator corresponding to this temperature. In this case the vapors leaving the first effect have a temperature of 160° Fahrenheit and they in turn will boil the liquids in the second effect, say at 125° Fahrenheit, and a vacuum is maintained on this evaporator corresponding to said temperature. As concentration proceeds the liquid is gradually taken from the first effect on through to the second effect and from there discharged when the desired degree of concentration is obtained, and continuous operation is obtained by replenishing with fresh liquid in the first effect. From this it is seen that the liquids are exposed to a high temperature for a long period of time in the first effect and should it be desired to operate with more than two effects, this high temperature must be increased for every added effect as the low temperatures are limited by the degree of vacuum that it is possible to maintain, and should the liquids be sensitive to the higher temperatures used for the long period of time, they will be detrimentally affected. It is to overcome this condition that the present invention has been devised and thus enable the multiple effect evaporation to be used without detrimentally affecting the product.

It is known that certain organic liquids, such as milk and liquids containing solids which are detrimentally affected by high temperatures, are detrimentally affected not only by the degree of temperature to which they are subjected but also by the duration of the same. Experiments have shown that a high temperature can be effectively used for a short period of time without affecting even the most sensitive materials. In the method of evaporation and the apparatus therefor forming the subject matter of the present application the liquid continuously flows under a high velocity from one step or effect to another. The temperature changes are rapid, due to the fact that the liquid passes through one step or effect after another, and as the circulation is continuously maintained, it is only necessary to repeat and repeat the cycle of operation until the desired degree of concentration is obtained. Again, in this case and also in the case of a single effect evaporator, the period of time can be so short and the temperature so controlled that liquids containing even the most sensitive organic matter can be concentrated without detrimentally affecting the material and all the economies of multiple effect evaporation are therefore obtained. This method depends in principle upon bringing the liquid into a superheated condition with respect to the conditions of vapor pressure and temperature existing in the first flash chamber by heating it very rapidly under pressure so that no vaporization, boiling, or ebullition is permitted to take place, then causing the superheated liquid to be almost instantaneously cooled by expansion into the first flash chamber, to the temperature corresponding to the vapor pressure of the small amount of liquid remaining in this flash chamber after the expansion. The temperature and pressure in this chamber depend, of course, on the temperature maintained in the heater which acts as a condenser for the vapors liberated in the flash chamber and as a secondary heater for the liquid, thereby recovering heat from the vapor resulting from the expansion.

That part of the liquid not evaporated in the first flash chamber collects in the cone at the bottom of this chamber and is in a superheated condition with respect to conditions existing in the next lower flash chamber. The liquid in the cone forms a seal and passes by gravity and suction through the connection and orifice into the next chamber, where expansion in the nearly empty chamber of a part of the liquid to vapor further cools the liquid. These steps are repeated as the liquid passes through all of the stages, the number of the latter corresponding to the number of effects or chambers. It is, therefore, clear that although the pressures in the apparatus are usually kept lower than atmospheric, it is possible to operate using pressures greater than atmospheric in most cases, the principle of operation remaining the same.

The limiting factors are the temperature and length of time of heating which the liquid undergoes without being detrimentally affected. This depends upon the liquid undergoing concentration. A condition of superheat and a high speed of circulation are therefore required, the circulation being obtained by any mechanical means, such as a pump.

One form of apparatus successfully employed in connection with this method of evaporation is illustrated in the accompanying drawing, said view representing, diagrammatically, a central, vertical, longitudinal section through the same.

Referring to the drawing in detail, A indicates a vertically disposed cylindrical-shaped casing provided with a cone-shaped bottom section 2 and a discharge pipe 3 which is connected with the suction side of a circulating pump 4 of suitable construction. The upper end of the cylindrical casing is closed by a head member 5 and it is interiorly divided by a plurality of cone-shaped diaphragms 6 to form a series of superposed evaporting chambers such as indicated at B, C and D.

Disposed at one side of the evaporator or at any suitable point adjacent the same are a plurality of liquid heaters generally indicated at E, F and G. These heaters are identical in construction, each consisting of an exterior casing 7 interiorly of which are mounted heating coils or tubes 8 through which the liquid to be heated is circulated. The uppermost heater indicated at E will hereinafter be referred to as the primary heater as it is heated from an exterior source, while the lower heaters indicated at F and G will be referred to as secondary heaters as they are heated by the vapors liberated by the evaporators. The coils or tubes of the primary heater are heated by steam or a like medium admitted through a pipe 9 which, when condensed, discharges through a pipe 10.

The secondary heaters are also provided with steam or vapor inlet connections, as indicated at 11 and 12, and they are also provided with condensate discharge pipes 13 and 14. The vapor conducting pipe 11 is connected with the uppermost evaporating chamber B, while the pipe 12 is connected with the intermediate evaporating chamber C. The lower evaporating chamber D is connected with a suction pipe 15 which in turn is connected with a condenser 16 of any suitable construction.

The several evaporating chambers referred to are maintained under various degrees of vacuum, the highest degree of vacuum being maintained in the chamber D as this is in direct communication with the condenser 16, while the lowest vacuum is maintained in the upper chamber B. This chamber is connected with the heater E through a pipe 17 and the discharge of the pump 4 is connected with the lowermost heater G through means of a pipe 18. It is thus evident that the evaporating chambers are in communication with each other and similarly the heaters, and furthermore that through pipes 17 and 18 communication is at all times maintained between the heaters and the vapor liberating chambers, and as a pump is employed liquid may be continuously circulated at any velocity desired. The liquid in its cyclic circulation discharging from the pump passes through the series of heaters, where its temperature is gradually increased and it then passes through a series of vapor liberating chambers where its temperature is gradually decreased. Each vapor liberating chamber is provided with a combination spray nozzle and valve, as indicated at 20, these valves being so regulated that a volume of liquid such as shown at 21 is maintained in the bottom of each chamber. This liquid serves the function of a trap to permit a desired degree of vacuum to be maintained in each chamber.

In actual operation steam is admitted through pipe 9 to heat the tubes 8. The pump 4 is set in operation and the liquid to be evaporated or concentrated is admitted to the lower evaporating chamber D through a pipe 23. The liquid is permitted to enter until the liquid level indicated at 24 is approximately assumed. This liquid enters the pump through a pipe 3 and when discharged thereby passes through pipe 18 and the tubes of the successive heaters indicated at G, F and E, and finally enters through pipe 17 and the spray nozzle 20, which delivers the liquid in the form of a spray into the upper evaporating chamber B. The temperature of the liquid in one instance may be 180°, this temperature being obtained by the passage of the liquid through the successive heaters.

A partial vacuum is maintained in the upper evaporating chamber and as a boiling temperature of approximately 160° Fahrenheit is desired, a proportional vacuum is obviously maintained. The temperature drop is, in other words, 20°, as the temperature of the entering liquid is 180°. A certain amount of vapor is therefore liberated and this discharges through pipe 11 and enters the heater F, where it is condensed and discharged through the pipe 13. The unevaporated liquid collects in the conical bottom portion or upper diaphragm 6 and its admission into the intermediate vapor liberating chamber C is regulated by the valve 20ª. The degree of vacuum maintained in the intermediate chamber is such that the boiling temperature will be 140° Fahrenheit. Another temperature drop of 20° is thus obtained.

The vapor liberated discharges through pipe 12 and as such serves the function of heating the secondary heater G, the condensate being discharged through pipe 14. The unevaporated liquid is trapped above the intermediate diaphragm 6ª and its admission into the lowermost evaporating chamber D is controlled by the valve 20ᵇ. A vacuum proportionate to another 20° drop is here maintained by the condenser 16 and the vapors liberated are carried off by pipe 15. The liquid collects in the bottom of the chamber D and is continuously drawn off by pipe 3 and the connected pump 4, entering the pump at a temperature of 120° Fahrenheit. It is then recirculated through the heaters and the cyclic circulation is repeated and repeated until the desired degree of concentration is obtained when it may be withdrawn at any point. The liquid while in circulation is constantly undergoing temperature changes. It leaves the lowermost vapor liberating chamber at 120° and enters the heater G, which is heated by vapors maintained under a temperature of 140°, as these are obtained from the intermediate chamber C. The liquid then passes through the heater F, which is maintained under a temperature of 160° Fahrenheit, as it is heated by the vapors liberated by the uppermost chamber B. The liquid then finally enters the primary heater E, which is heated by live steam, and its temperature is thus raised another 20° when a final temperature of 180° is reached. It enters the uppermost vapor liberating chamber at this temperature and is then subjected to a temperature drop, as it leaves this chamber at 160° Fahrenheit. It loses another 20° in the intermediate chamber and a final 20° in the lowermost chamber and, as such, re-enters the lowermost heater at 120°. The liquid is for this reason not subjected to any high temperature for any extended period of time, as the liquid is maintained under a fairly high velocity, and detrimental effects are thus avoided.

For purposes of illustration it might be stated that the total amount of time required to enter the liquid in the upper evaporating chamber, to flash or instantly evaporate the same and then to permit the unevaporated liquid to settle by gravity to the bottom of the chamber and discharge therefrom, is approximately one-half a second of time. It is not necessary to maintain a very large body of liquid in the cone-shaped bottom section 2; that is, the liquid entering the lowermost chamber and liberating its vapors may enter the pipe 3 almost instantly, and it is therefore only subjected momentarily even to the lowermost temperature.

From the foregoing it can be seen that I have provided a method and apparatus whereby a liquid may be evaporated by multiple effect evaporation, and whereby the liquid is at no time exposed to high or detrimental temperatures sufficiently long to either affect the taste, color or appearance of the liquid, this being due to the fact that the liquid entering one evaporating chamber passes through with great rapidity. It then enters the next evaporating chamber or effect and passes therethrough with the same rapidity. It similarly passes through the heaters with the same rapidity and as such is never exposed to high temperatures sufficiently long to be detrimentally affected.

It was stated in the beginning of the specification that the liquid to be evaporated was entered through pipe 23 and that this pipe remained open until a liquid level such as indicated by the line 24 was obtained, and that heating of the liquid and evaporation thereof would thereafter take place. I wish it understood that a given body of liquid may in this manner be concentrated to a desired degree and the whole contents then removed; for instance, through a pipe 26, or it is possible to slightly open a valve 27 mounted on pipe 26 and similarly to slightly open a valve such as shown at 28 to permit the evaporators to be continuously operated; that is, valves 27 and 28 are first closed until the desired degree of evaporation is obtained and they may then be slightly opened to permit a continuous admission and discharge of the liquid.

It should be understood that while specific temperatures have here been mentioned, it is obvious that any desired temperature variation may be maintained. I wish it further understood that while the use of vacuum in the flash chambers has been mentioned, any suitable pressure, either above or below atmospheric, or a combination of both, may be used in the system. I also wish it understood that while the apparatus here shown is more or less diagrammatically illustrated, that various changes in form and proportions may be resorted to within the scope of the appended claims, and that the materials and finish of the several parts employed may be such as the experience and judgment of the manufacturer may dictate or various uses may demand.

Having thus described my invention, what I claim and desire to secure by Letters Patent is—

1. An apparatus for producing multiple effect evaporation of liquids, comprising a plurality of flash chambers, arranged at successively lower levels relative to each other, a liquid seal connection between successive flash chambers, means whereby the flash chambers may be successively maintained under decreasing degrees of pressure, a plurality of connected liquid heaters, means whereby said heaters may be successively maintained at increasing temperatures, a connection for the delivery of the heated liquid from the heater maintained at highest temperature into the flash chamber maintained under highest pressure, a connection for the delivery of the liquid to be heated from the flash chamber maintained under lowest pressure to the heater maintained under lowest temperature, and means for supplying heat to the heater maintained under highest temperature.

2. An apparatus for producing multiple effect evaporation of liquids, comprising a plurality of flash chambers arranged at successively lower levels relative to each other, a liquid seal connection between successive flash chambers, means whereby the flash chambers may be successively maintained under decreasing degrees of pressure, a plurality of connected liquid heaters, means whereby said heaters may be successively maintained at increasing temperatures, a connection for the delivery of the heated liquid from the heater maintained at highest temperature into the flash chamber maintained under highest pressure, a connection for the delivery of the liquid to be heated from the flash chamber maintained under lowest pressure to the heater maintained under lowest temperature, means for supplying heat to the heater maintained under highest temperature, and a circulating pump whereby the liquid may be circulated through the heaters and the flash chambers at high velocity.

3. An apparatus for producing multiple effect evaporation of liquids comprising a plurality of flash chambers, said flash chambers being vertically disposed and each flash chamber having a cone-shaped bottom and each cone-shaped section having a discharge outlet whereby liquid in each chamber forms a liquid seal, and each flash chamber having an inlet, a connection between the discharge of one flash chamber and the inlet of the other, a spray nozzle within each flash chamber and connected with the inlet thereof, means whereby the flash chambers may be successively maintained under decreasing degrees of pressure, a plurality of connected heaters, means whereby said heaters may be successively maintained at increasing temperatures, a connection for the delivery of liquid from the heater maintained under highest temperature to the flash chamber maintained under highest pressure, a connection for the delivery of liquid from the flash chamber maintained under lowest pressure to the heater maintained under lowest temperature, and a circulating pump in said connection whereby a circulation of the liquid through the heaters and evaporators may be maintained at high velocity.

4. An apparatus for producing multiple effect evaporation of liquids comprising a plurality of flash chambers, said flash chambers being vertically disposed and each flash chamber having a cone-shaped bottom and each cone-shaped section having a discharge outlet whereby liquid in each chamber forms a liquid seal, and each flash chamber having an inlet, a connection between the discharge of one flash chamber and the inlet of the other, a spray nozzle within each flash chamber and connected with the inlet thereof, means whereby the flash chambers may be successively maintained under decreasing degrees of pressure, a plurality of connected heaters, means whereby said heaters may be successively maintained at increasing temperatures, a connection for the delivery of liquid from the heater maintained under highest temperature to the flash chamber maintained under highest pressure, a connection for the delivery of liquid from the flash chamber maintained under lowest pressure to the heater maintained under lowest temperature, a connection for passing vapor formed in the flash chamber under highest pressure to the secondary heater maintained under highest temperature, a connection for passing vapor formed in a flash chamber under intermediate pressure to a secondary heater maintained under an intermediate temperature lower than that of adjacent first-named secondary heater, a vapor connection from the flash chamber maintained under lower pressure to a condenser and source of vacuum, and a liquid pump for circulating the liquid through the heaters and said chambers at relatively high velocity.

5. An apparatus for producing multiple effect evaporation of liquids comprising a plurality of communicating flash chambers arranged at successively lower levels relative to each other, means whereby said flash chambers may be successively maintained under decreasing degrees of pressure, a primary and a plurality of secondary liquid heaters in communication with each other and the flash chambers, means whereby the liquid may be continuously circulated through the heaters and flash chambers, means for supplying heat to the primary heater, and means whereby the secondary heaters may be heated by the vapors liberated in successive flash chambers and thereby maintained under various degrees of temperature.

6. An apparatus for producing multiple effect evaporation of liquids comprising a plurality of flash chambers, arranged at successively lower levels with respect to each other, means whereby the flash chambers may be successively maintained under decreasing degrees of pressure, a primary and connected secondary liquid heaters connected with said chambers, means whereby said heaters may be maintained at increasing temperatures, said means comprising a heat inlet to the primary heater, a vapor connection between the flash chamber maintained under highest pressure, and one of the secondary heaters, and a vapor connection between the flash chamber maintained under a sucessively lower pressure and a secondary heater maintained at a lower temperature than the first-named secondary heater, means for passing the liquid through the heaters and thence from the heater maintained at highest temperature into the flash chamber maintained at highest pressure, through the flash chambers and thence from the flash chamber maintained at lowest pressure into the heater maintained at lowest temperature.

7. An apparatus for producing multiple effect evaporation of liquids comprising a plurality of communicating flash chambers arranged successively lower relative to each other, means whereby said flash chambers may be successively maintained under decreasing degrees of pressure, a plurality of liquid heaters communicating with each other and the flash chambers, means whereby said heaters may be successively maintained at increasing temperatures, and means whereby the liquid may be continuously circulated through the heaters and the flash chambers in a direction that will cause the liquid to be heated by steps while passing through the heaters and cooled by steps while passing through the flash chambers.

8. A method of evaporating liquids comprising a cycle in which the liquid undergoing evaporation is subjected to mechanically applied initial pressure and to heat in stages of successively increasing temperatures by salvaged heat, then brought to a condition of superheat by heat from an external source, then lowering the pressure by successive stages, each of substantial drop, whereby the liquid is expanded by stages into vapor, utilizing the vapor of successive pressure stages to supply the salvaged heat to the liquid in the stated temperature stages.

9. A method of concentrating liquids comprising a cycle in which the liquid undergoing concentration is subjected to mechanically applied pressure and to heat in stages of successively increasing temperatures by salvaged heat, then brought to a condition of superheat by heat applied from an external source, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages.

10. A method of effecting multiple effect evaporation of liquids which comprises a cycle in which the liquid undergoing evaporation is subjected to mechanically applied pressure and then to heat in stages of successively increasing temperatures by salvaged heat without allowing any evaporation to take place, then brought to a condition of superheat by heat from an external source, without allowing evaporation to take place, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages, controlling the pressures in the pressure stages by the temperature of the liquid in the stated temperature stages.

11. A method of concentrating liquids comprising a cycle in which the liquid undergoing concentration is subjected to mechanically applied pressure sufficient to circulate said liquid at high velocity through the cycle and to heat in stages of successively increasing temperatures by salvaged heat, then brought to a condition of superheat by heat applied from an external source, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages, and maintaining the liquid under high velocity during circulation.

12. A method of concentrating liquids comprising a cycle in which the liquid undergoing concentration is subjected to mechanically applied pressure and to heat in stages of successively increasing temperatures by salvaged heat, then brought to a condition of superheat by heat applied from an external source, then lowering the pressure by successive stages, each stage of substantial drop, the liquid entering each stage in a superheated condition with relation to that stage, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages.

13. A method of effecting multiple effect evaporation of liquids which comprises a cycle in which the liquid undergoing evaporation is subjected to mechanically applied pressure and then to heat in stages of successively increasing temperatures by salvaged heat without allowing any evaporation to take place, then brought to a condition of superheat by heat from an external source, without allowing evaporation to take place, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages, controlling the pressures in the pressure stages by condensation of the vapor resulting from the expansion of liquid in the connected pressure stage.

14. A method of effecting a multiple effect evaporation of liquids which comprises a cycle in which the liquid undergoing evaporation is subjected to mechanically applied pressure and then to heat in stages of successively increasing temperatures by salvaged heat without allowing any evaporation to take place, then brought to a condition of superheat by heat from an external source, without allowing evaporation to take place, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages, controlling the pressures in the pressure stages by the temperature of the liquid in the stated temperature stages, and utilizing gravity in effecting the flow of liquid through the successive pressure stages.

15. A method of effecting a multiple effect evaporation of liquids which comprises a cycle in which the liquid undergoing evaporation is subjected to mechanically applied pressure and then to heat in stages of successively increasing temperatures by salvaged heat without allowing any evaporation to take place, then brought to a condition of superheat by heat from an external source, without allowing evaporation to take place, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages, controlling the pressures in the pressure stages by the temperature of the liquid in the stated temperature stages, the liquid being drawn into each pressure stage by reduced pressure.

16. A method of effecting a multiple effect evaporation of liquids which comprises a cycle in which the liquid undergoing evaporation is subjected to mechanically applied pressure and then to heat in stages of successively increasing temperatures by salvaged heat without allowing any evaporation to take place, then brought to a condition of superheat by heat from an external source, without allowing evaporation to take place, then lowering the pressure by successive stages, each stage of substantial drop, whereby a part of the liquid is expanded by stages into vapor, utilizing the vapor from the highest pressure stage to supply the salvaged heat to the stage of highest temperature maintained by salvaged heat, utilizing the vapor from intermediate pressure stages to supply the salvaged heat to intermediate stages, maintaining the final pressure stage at a mechanically maintained low pressure, utilizing the vapor of the successive pressure stages except the lowest pressure stage to supply the salvaged heat to the liquid in the stated temperature stages, controlling the pressures in the pressure stages by the temperature of the liquid in the stated temperature stages, the liquid being drawn into each pressure stage by gravity and reduced pressure.

17. A method of evaporating liquids comprising a cycle in which the liquid undergoing evaporation is subjected to mechanically applied initial pressure and to heat in stages of successively increasing temperatures by salvaged heat resulting from expansion, then brought to a condition of superheat by heating from an external source, then lowering the pressure by successive stages, each of substantial drop, whereby a part of the liquid is expanded by stages into vapor, utilizing the vapor resulting from the expansion of successive pressure stages to supply the salvaged heat to the liquid in the stated temperature stages.

18. A method of evaporating liquid comprising heating the liquid in successive stages of increasing temperature while in liquid form, one stage being effected by salvaged heat and another by heat from an external source, then lowering the pressure on said liquid by successive stages, each stage being a substantial drop in temperature, whereby liquid is expanded by stages into vapor, and utilizing the vapor of one of said stages to supply salvaged heat to the liquid in said first-mentioned heating stage.

19. A method of evaporating liquid comprising heating the liquid in successive stages of increasing temperature while in liquid form, one stage being effected by salvaged heat, and another stage by heat from an external source, then lowering the pressure on said liquid by distinct successive stages, each stage being a substantial drop in pressure, whereby liquid is expanded by stages into vapor, utilizing vapor of one of said stages to supply salvaged heat to liquid in said first mentioned stage, and introducing liquid from the last of said successive pressure reduction stages to said first mentioned heating stage.

20. A method of evaporating liquid comprising forming a circulation cycle for the liquid, said cycle comprising heating the liquid in liquid form in successive temperature stages, then lowering the pressure on said liquid by distinct abrupt successive stages without further addition of heat to the liquid, and reintroducing liquor from the last of said last-named stages into the first of said successive temperature stages.

21. A method of evaporating liquids comprising forming a circulation cycle for the liquid, said cycle comprising heating the liquid in liquid form without ebullition, then lowering the pressure on said liquid by distinct abrupt successive stages without further addition of heat to the liquid, each stage being a substantial drop in pressure, and repeating the cycle on liquid from the last of said stages.

22. In evaporating apparatus, a series of evaporating chambers, a heater remote from said chambers, means forming a restricted passage between said chambers for flow of liquid from the first chamber to the second, means for serially circulating liquid through said heater and through said chambers, and means for removing vapor from said chambers and for maintaining a vapor pressure in the second chamber which is substantially less than the vapor pressure in the first chamber, said chambers being characterized by the absence of means for imparting heat to the liquor within the same.

23. An apparatus for producing multiple effect evaporation of liquids, comprising a plurality of flash evaporating chambers, a liquid seal connection between said chambers, means for maintaining the flash chambers under successively decreasing degrees of pressure, a plurality of serially connected heaters, said heaters being adapted to heat liquid passed through the same to successively increasing temperatures, a connection for the delivery of heated liquid from the last of said heaters into the flash chamber maintained under highest pressure, and a connection for the delivery of the liquid to be heated from the flush chamber maintained under lowest pressure to the heater maintained under lowest temperature, said chambers being characterized by the absence of means for imparting heat to the liquor within the same.

24. An apparatus for producing multiple effect evaporation of liquids, comprising two flash evaporation chambers, a liquid seal connection from the first to the second of said chambers, a pair of serially connected liquid heaters adapted to heat liquid circulated through the same to successively increasing temperatures as the liquid passes from the first to the last of said heaters, a connection for the delivery of heated liquid from the last of said heaters into the first chamber, means utilizing vapor from the first chamber for supplying heat to the first of said heaters, and means for maintaining a pressure in said second chamber which is substantially less than the pressure in the first chamber, said chambers being characterized by the absence of means for imparting heat to the liquor within the same.

25. An apparatus for producing multiple effect evaporation of liquids, comprising two flash evaporation chambers, a liquid seal connection from the first to the second of said chambers, a pair of serially connected liquid heaters adapted to heat liquid circulated through the same to successively increasing temperatures as the liquid passes from the first to the last of said heaters, a connection for the delivery of heated liquid from the last of said heaters into the first chamber, means utilizing vapor from the first chamber for supplying heat to the first of said heaters, means for supplying heat from an external source to said last heater whereby liquid delivered from the same into the first chamber is at a temperature substantially higher than the temperature of vapor removed from said first chamber, and means for maintaining a pressure in the second chamber which is substantially less than the first chamber.

DAVID D. PEEBLES.